(12) United States Patent
Lee et al.

(10) Patent No.: US 10,365,740 B2
(45) Date of Patent: Jul. 30, 2019

(54) IN-CELL TOUCH DISPLAY DEVICE WITH TRANSPARENT MESH-LIKE TOUCH ELECTRODES

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 15/632,819

(22) Filed: Jun. 26, 2017

(65) Prior Publication Data

US 2018/0011577 A1 Jan. 11, 2018

(30) Foreign Application Priority Data

Jul. 5, 2016 (TW) .............................. 105121172 A

(51) Int. Cl.
*G06F 3/041* (2006.01)
*G02F 1/1333* (2006.01)
*G06F 3/044* (2006.01)
*G02F 1/1343* (2006.01)

(52) U.S. Cl.
CPC ........ *G06F 3/0412* (2013.01); *G02F 1/13338* (2013.01); *G06F 3/044* (2013.01); *G06F 3/0416* (2013.01); *G02F 1/134309* (2013.01); *G02F 2001/134372* (2013.01); *G06F 2203/04103* (2013.01); *G06F 2203/04107* (2013.01); *G06F 2203/04112* (2013.01)

(58) Field of Classification Search
CPC ...... G06F 3/0412; G06F 3/0416; G06F 3/044; G02F 1/13338
USPC ..................................... 345/156–174; 349/12
See application file for complete search history.

(56) References Cited

U.S. PATENT DOCUMENTS

| 10,061,432 B2* | 8/2018 | Ahn ...................... G06F 3/0412 |
| 2015/0091849 A1* | 4/2015 | Ludden ................. G06F 3/0412 345/174 |
| 2015/0145818 A1* | 5/2015 | Jeon ........................ G06F 3/044 345/174 |
| 2015/0234510 A1* | 8/2015 | Chang ................... G06F 3/0412 345/173 |

(Continued)

*Primary Examiner* — Prabodh M Dharia
(74) *Attorney, Agent, or Firm* — Muncy, Geissler, Olds & Lowe, P.C.

(57) ABSTRACT

An in-cell touch display device includes: a lower substrate a thin film transistor layer, a common electrode layer, an electrode integration layer and a display material layer. The thin film transistor layer is arranged on the lower substrate, and includes a plurality of thin film transistors. The common electrode layer is arranged on the thin film transistor layer, and includes a plurality of common electrodes connected to each other. The electrode integration layer is arranged on the common electrode layer, and includes a plurality of pixel electrodes and a plurality of touch sense electrodes each corresponding to a group of the pixel electrodes. Each touch sense electrode is formed by a plurality of transparent mesh-like touch electrodes surrounding the corresponding pixel electrodes. The display material layer is arranged on the electrode integration layer, and includes a display material.

13 Claims, 8 Drawing Sheets

(56) References Cited

U.S. PATENT DOCUMENTS

| | | | |
|---|---|---|---|
| 2015/0287381 A1* | 10/2015 | Kim | G06F 3/044 |
| | | | 345/174 |
| 2015/0378486 A1* | 12/2015 | Yu | G06F 3/0412 |
| | | | 345/174 |
| 2016/0109980 A1* | 4/2016 | Lee | G06F 3/044 |
| | | | 345/174 |
| 2016/0179273 A1* | 6/2016 | Lee | G06F 3/0416 |
| | | | 345/174 |
| 2016/0266679 A1* | 9/2016 | Shahparnia | G06F 3/044 |
| 2016/0282990 A1* | 9/2016 | Kimura | G02F 1/13338 |
| 2016/0291741 A1* | 10/2016 | Zhou | G06F 3/044 |
| 2016/0334660 A1* | 11/2016 | Lin | G02F 1/13338 |
| 2017/0090644 A1* | 3/2017 | Yao | G06F 3/0416 |
| 2017/0153766 A1* | 6/2017 | Kimura | G06F 3/0418 |
| 2017/0192508 A1* | 7/2017 | Lim | G06F 3/016 |
| 2017/0192560 A1* | 7/2017 | Ham | G06F 3/0412 |
| 2017/0192614 A1* | 7/2017 | Lee | G06F 3/0412 |
| 2017/0220182 A1* | 8/2017 | Schwartz | G06F 3/0416 |

\* cited by examiner

IN-CELL TOUCH DISPLAY DEVICE WITH TRANSPARENT MESH-LIKE TOUCH ELECTRODES

BACKGROUND OF THE INVENTION

1. Field of the Invention

The present invention relates to the technical field of touch display panels and, more particularly, to an in-cell touch display device with transparent mesh-like touch electrodes.

2. Description of Related Art

The major development of embedded touch technology is focused on on-cell technology and in-cell technology. The on-cell technology is provided to dispose touch sensors on a thin film and then bond the thin film onto the upper surface of the upper glass substrate. The in-cell technology is provided to integrate the touch sensors within the display unit so that the display unit is provided with the ability of the touch detection. Therefore, the touch display panel does not need to be bonded with an additional touch panel so as to simplify the assembly procedure.

The operation principle of touch detection can divided into optical touch detection technology, resistive touch detection technology and capacitive touch detection technology. In the optical touch detection technology, it uses optical sensors to detect the changes of luminance caused by a touch, and then detects the touch position. In accordance with the operation principle of the resistive touch detection technology, an upper sense electrode layer and a lower sense electrode layer come into touch with each other by touch pressure for generating a current change, and then the touch position can be detected by measuring the change of current. In the capacitive touch detection technology, due to the electrostatic induction of touch, the sense electrode layer generates a voltage change, and the touch position can be detected by measuring the change of voltage.

In order to achieve the miniaturization of electronic devices, the integration of components and the convenience of the manufacture process, the in-cell touch display device has become the most important one. However, there are still several problems remained to be solved. In the in-cell touch display device, since the touch sensors are disposed within the display device, the touch signal and the display signal are easily interfered with each other. In the case of mutual-capacitance sense technology, the touch sense layer (Rx) and the touch drive layer (Tx) will cause a lot of noises, resulting in the complexity of layout, and thus it is difficult to integrate the touch sensors within the display device.

Therefore, it is desirable to provide an in-cell touch display with transparent mesh-like touch electrodes to mitigate and/or obviate the aforementioned problems.

SUMMARY OF THE INVENTION

The object of the present invention is to provide an in-cell touch display device with transparent mesh-like touch electrodes, which is provided with an electrode integration layer to integrate the pixel electrodes and the touch sense electrodes in the same layer, such that the touch elements and the display device can be integrated in the structure and in the manufacture process, and thus the size of the touch display device can be dramatically reduced and the manufacture process can be simplified. In addition, the self-capacitance sense technology is adopted in the present disclosure to reduce interference the lines connected to corresponding sense electrodes. In some embodiments of the present disclosure, the sensitivity of the touch sense electrode is considered, and thus the reflection shielding electrodes are provided and applied with corresponding reflection shielding signal to prevent other elements from interfering the touch sense electrodes. Accordingly, the noise problem of the in-cell touch display can be mitigated.

In accordance with one aspect of the present invention, there is provided an in-cell touch display device with transparent mesh-like touch electrodes, which includes: a lower substrate, a thin film transistor layer, a common electrode layer, an electrode integration layer, and a display material layer. The thin film transistor layer is arranged on the lower substrate, and including a plurality of thin film transistors. The common electrode layer is arranged on the thin film transistor layer, and includes a plurality of common electrodes which are connected to each other. The electrode integration layer is arranged on the common electrode layer, and includes a plurality of pixel electrodes and a plurality of touch sense electrodes each corresponding to a group of the pixel electrodes, wherein each touch sense electrode is formed by a plurality of transparent mesh-like touch electrodes surrounding the corresponding pixel electrodes. The display material layer is arranged on the electrode integration layer, and includes a display material.

In accordance with another aspect of the present invention, there is provided an in-cell touch display device with transparent mesh-like touch electrodes, which includes: a lower substrate, a thin film transistor layer, an electrode integration layer, and a display material layer. The thin film transistor layer is arranged on the lower substrate, and includes a plurality of thin film transistors. The electrode integration layer is arranged on the thin film transistor layer, and includes a plurality of common electrodes connected to each other, a plurality of pixel electrodes, and a plurality of touch sense electrodes each corresponding to a group of the pixel electrodes, wherein each touch sense electrode is formed by a plurality of transparent mesh-like touch electrodes surrounding the corresponding pixel electrodes. The display material layer is arranged on the electrode integration layer, and including a display material.

DETAILED DESCRIPTION OF THE PREFERRED EMBODIMENT

Figure 1:
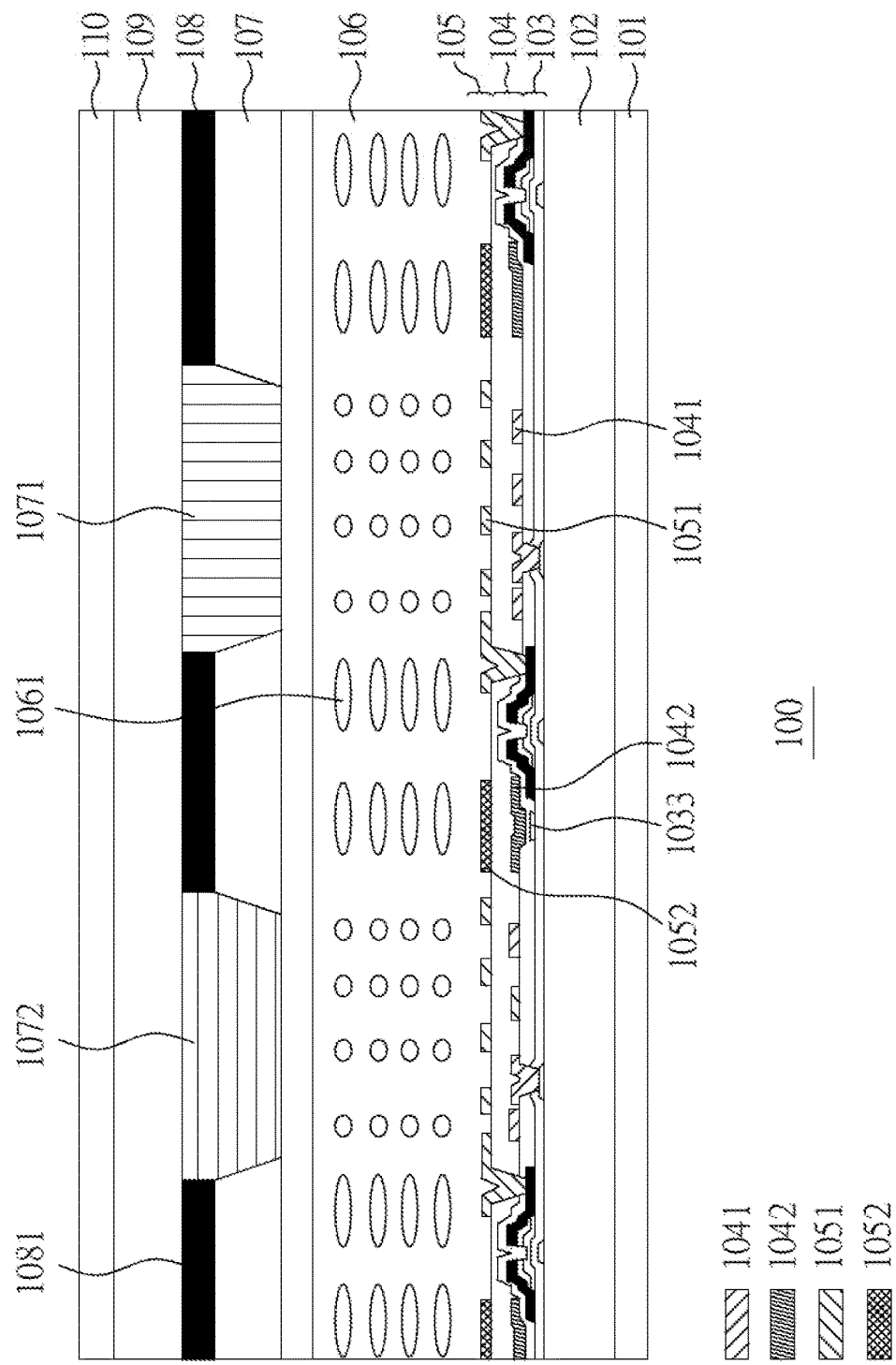
FIG. 1 is a cross-sectional view of an in-cell touch display device with transparent mesh-like touch electrodes in accordance with a first embodiment of the present disclosure.

The present disclosure relates to an in-cell touch display device with transparent mesh-like touch electrodes. FIG. 1 is a cross-sectional view of an in-cell touch display device 100 with transparent mesh-like touch electrodes in accordance with a first embodiment of the present disclosure. As shown, the touch display device 100 sequentially includes a lower polarization layer 101, a lower substrate 102, a thin film transistor layer 103, a common electrode layer 104, an electrode integration layer 105, a display material layer 106, a color filter layer 107, a black matrix layer 108, an upper substrate 109 and a upper polarization layer 110.

The lower substrate 102 is parallel to the upper substrate 109. Each of the lower substrate 102 and the upper substrate 109 can be a glass substrate or a polymer substrate.

The lower polarization layer 101 is disposed below the lower substrate 102, and the upper polarization layer 110 is disposed above the upper substrate 109, wherein light passing through the lower polarization layer 101 becomes polarized light. When the pixels are in the dark state, the polarized light cannot pass through the upper polarization layer 110 and, when the pixels are in the bright state, the polarized light can pass through the upper polarization layer 110. Whether the pixels are in the dark state or the bright state depends on the state of the display material layer 106.

Figure 2:
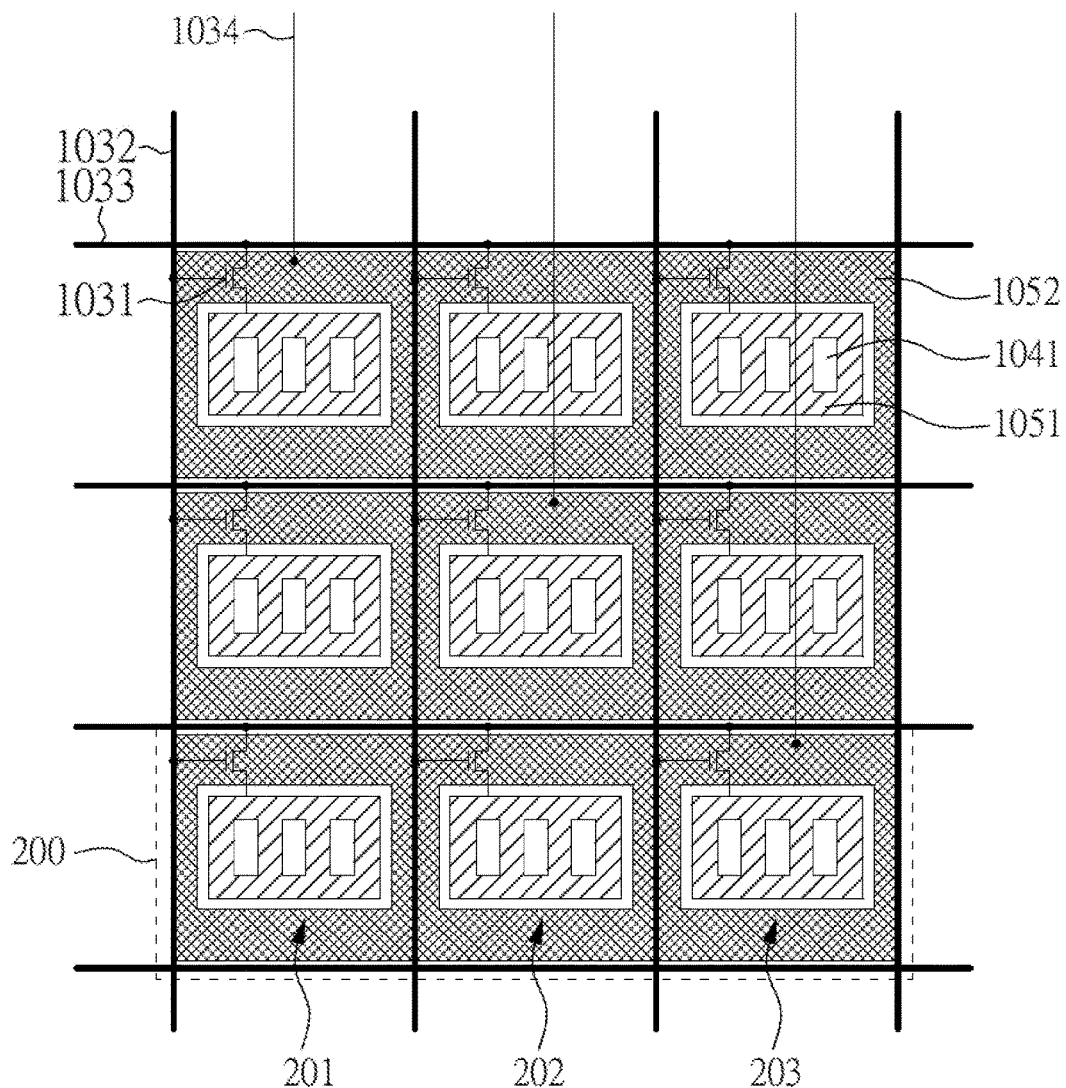
FIG. 2 is a top view of the thin film transistor layer and the electrode integration layer in accordance with a first embodiment of the present disclosure.

With reference to refer to FIG. 1 and FIG. 2, the thin film transistor layer 103 includes a plurality of thin film transistors (TFTs) 1031, a plurality of scan lines 1032, a plurality of data lines 1033, and plurality of touch sense electrode traces 1034. In this embodiment, the TFT 1031 is a bottom-gate structure. In other embodiments, the TFT 1031 can be a top-gate structure. In this embodiment, the TFT 1031 is an amorphous silicon (a-Si) transistor. In other embodiments, the TFT 1031 can be a polysilicon transistor, for example, a low temperature polysilicon (LTPS) transistor.

FIG. 2 is a top view of the thin film transistor layer 103 and the electrode integration layer 105 in accordance with a first embodiment of the present disclosure. As shown, the scan lines 1032 and the data lines 1033 are intersected with each other, and the scan line 1032 and the data line 1033 are substantially perpendicular to each other. Each intersection of the scan lines 1032 and the data lines 1033 is provided with at least a TFT 1031 and a pixel electrode 1051. The gate of the TFT 1031 is connected to the scan line 1032. The scan line 1032 is able to control the on/off state of the TFT 1031. The source of TFT 1031 is connected to the data line 1033, and the drain of the TFT 1031 is connected to the pixel electrode 1051. When being in the on state, the TFT 1031 is employed to transmit the signal at the data line 1033 to the pixel electrode 1051. The touch sense electrode trace 1034 is employed to transmit a capacitive stimulating signal to the touch sense electrode 1052 or receive a touch sense signal from the touch sense electrode 1052. Each touch sense electrode 1052 is formed by a plurality of transparent mesh-like touch electrodes surrounding the corresponding pixel electrodes 1051. Each touch sense electrode 1052 is connected to at least one touch sense electrode trace 1034. The touch sense electrode trace 1034 is formed by transparent conductive material of the same layer, or by conductive metal in a data line metal sub-layer or scan line metal sub-layer of the thin film transistor layer 103. The touch sense electrode traces 1034 are preferred to be metal traces.

With reference to FIG. 1 and FIG. 2, the common electrode layer 104 includes a plurality of common electrodes 1041 and a plurality of reflection shielding electrodes 1042. It is noted that there is a space between two common electrodes 1041 which, however, may be or may not be connected to each other at a location beyond the cross section shown in FIG. 1. Similarly, there is a space between two pixel electrodes 1051 which, however, may be or may not be connected to each other at a location beyond the cross section shown in FIG. 1.

In this embodiment, the common electrodes 1041 are electrically connected to each other, and thus the common electrodes 1041 are in the same voltage level. Between the common electrodes 1041 and pixel electrodes 1051, there is an electrical field formed to control the display material 1061 of the display material layer 106. Due to being in the same layer, the common electrodes 1041 and the reflection shielding electrodes 1042 can be formed in the same manufacture process. Specifically, the common electrodes 1041 and the reflection shielding electrodes 1042 can be made of the same material, such as ITO, ZnO, IZO, GZO, conductive polymer, carbon nanotube, graphene, or silver film with thickness less than 50 nanometers. The common electrodes 1041 and the reflection shielding electrodes 1042 can also be formed by the same mask. Therefore, the manufacture process can be simplified. However, in other embodiments, the common electrodes 1041 and the reflection shielding electrodes 1042 can be formed in different manufacture process steps, or can be formed with different transparent conductive materials or by different masks.

The reflection shielding electrodes 1042 are disposed at positions corresponding to the positions of the touch sense electrodes 1052. Specifically, the reflection shielding electrodes 1042 are disposed below the touch sense electrodes 1052. At least part of the touch sense electrode 1052 is superimposed on at least part of the corresponding reflection shielding electrode 1042. Since the touch sense electrode 1052 is very sensitive, it may be interfered easily if there is a line (for example, data line 1033) disposed below the touch sense electrode 1052. Therefore, a reflection shielding electrode 1042 is disposed between the touch sense electrode 1052 and the data line 1033, and the reflection shielding electrode 1042 can provide a shielding effect to prevent the data line from interfering the touch sense electrode 1052. In this embodiment, the common electrode 1041 and the reflection shielding electrode 1042 are not electrically connected together, and thus different signals can be applied to the common electrode 1041 and the reflection shielding electrode 1042. For example, a direct current (DC) signal can be applied to the common electrode 1041, and an alternating current (AC) signal can be applied to the reflection shielding electrode 1042.

The electrode integration layer 105 includes a plurality of pixel electrodes 1051 and a plurality of touch sense electrodes 1052. As shown in FIG. 1, the pixel electrodes 1051 and the touch sense electrodes 1052 are substantially integrated in the same layer. Specifically, at least part of the pixel electrode 1051 and part of the touch sense electrode 1052 are disposed in the same plane. Accordingly, the touch sense elements can be integrated and embedded into the display device, and the size of the integrated touch display device can be miniaturized. Since the pixel electrodes 1051 and the touch sense electrodes 1052 are in the same layer, both are preferably formed in the same manufacture process. In particular, the pixel electrodes 1051 and the touch sense electrodes 1052 can be made of the same material, such as ITO ZnO, IZO, GZO, conductive polymer, carbon nanotube, graphene, or silver film with thickness less than 50 nanometers. Furthermore, the pixel electrodes 1051 and the touch sense electrodes 1052 can also be formed by using the same mask. Accordingly, the manufacture process can be simplified. However, in other embodiments, the pixel electrode 1051 and the touch sense electrode 1052 can be formed in different manufacture processes, with different transparent conductive material, or by different masks.

An insulating layer may be provided between the thin film transistor layer 103 and the common electrode layer 104 or between the common electrode layer 104 and the electrode integration layer 105, so as to support these layers and insulate these layers from each other. If one of these layers needs to be electrically connected with another one, vias can be provided to achieve the desired electric connection.

As shown in FIG. 2, each pixel 200 includes three sub-pixels 201, 202 and 203. The sub-pixels 201, 202 and 203 respectively display three different colors including but not limited to red color, green color and blue color. In this embodiment, the pixel electrode 1051 is preferably located in the center of the sub-pixel, and the touch sense electrode 1052 is preferably located at the periphery of the sub-pixel and surrounds the pixel electrode 1051. As a result, the aperture ratio and the light transparency of the pixel 200 can be maintained as high as possible. In other embodiments, the touch sense electrodes 1052 are located on one or more sides of the sub-pixel, or may be covered by the black matrix layer 108. In such a configuration, the plurality of touch sense electrodes 1052 appear to be a mesh-like shape, and each touch sense electrode 1052 may cover the surrounding of a plurality of pixel electrodes 1051. For example, one touch sense electrode 1052 covers the surrounding of five hundred pixel electrodes 1051. The touch sense electrode trace 1034 is made of a transparent conductive material of the thin film transistor layer 103, or is made of a conductive metal of the metal layer below the reflection shielding electrode 1042 so as to reduce the impedance and avoid interference to the sense electrodes 1052.

The present in-cell touch display device 100, adopts the self-capacitance sense technology, in which the self-capacitance (C) is defined as the amount of charge (Q) required for increasing a unit voltage (V) in a single conductor. In comparison with the mutual capacitance sense technology that requires two touch sense electrode layers for establishing capacitance therebetween to carry out the touch detection, the self-capacitance sense technology only needs a single touch sense electrode layer for performing the touch detection with the self-capacitance. The sensitivity and signal noise ratio (SNR) of the self-capacitance sense technology are better than those of the mutual capacitance sense technology, and thus the self-capacitance sense technology is especially suitable for the in-cell touch display. Therefore, in FIG. 1, the touch sense electrodes 1052 are in the same plane, and only the touch sense electrodes 1052 are used in touch detection. In FIG. 2, the touch sense electrode 1052 receives capacitance stimulation signal from the touch sense electrode traces 1034 and also transmits touch sense signal to the touch sense electrode traces 1034. The touch sense electrode 1052 converts the capacitance stimulation signal into the touch sense signal by self-capacitance sense effect. For example, when the human body approaches or touches the touch sense electrode 1052, the touch sense signal is greatly attenuated or enhanced by the electrostatic induction of the human body. Therefore, a touch sense control circuit 520 can determine whether the touch sense electrode 1052 is touched by detecting the touch sense signal.

With reference to FIG. 1, the display material layer 106 includes a display material 1061 and is arranged on the electrode integration layer 105. The display material 1061 is provided with a polarity. In this embodiment, the display material 1061 is liquid crystal.

The display technology used in this embodiment is known as fringe field switching (FFS). As shown in FIG. 1, the pixel electrodes 1051 are parallel to the common electrode 1041, and the two electrodes are disposed in a staggered arrangement. That is, the common electrode 1041 is disposed below the space in between two adjacent pixel electrodes 1051, or a pixel electrode 1051 is disposed above the space in between two adjacent common electrodes 1041.

Figure 3A:
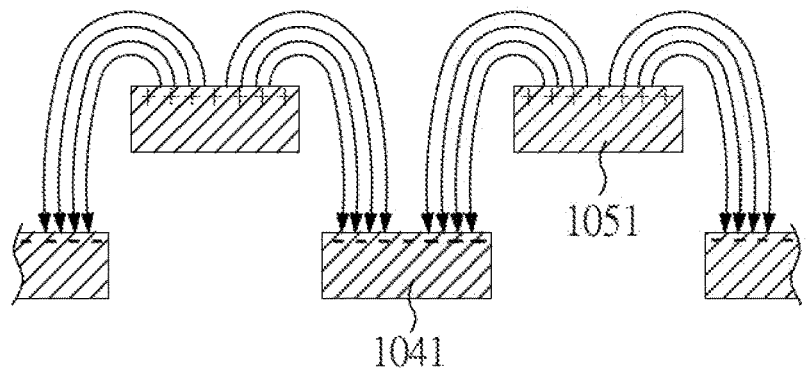
FIG. 3A is a schematic view of the electric field between the pixel electrodes and the common electrodes in accordance with a first embodiment of the present disclosure.

FIG. 3A is a schematic view of the electric field between the pixel electrodes 1051 and the common electrodes 1041 in accordance with a first embodiment of the present disclosure. As shown in FIG. 3A, when the pixel electrodes 1051 and the common electrodes 1041 are respectively applied with a voltage, an electric field is formed therebetween. For example, if the pixel electrodes 1051 are used as the positive electrodes and the common electrodes 1041 are used as the negative electrodes, the electric field is emitted from the pixel electrodes 1051 toward the common electrodes 1041. In this case, the display material 1061 is affected by the electric field emitted from the upper surface of the pixel electrode 1051 toward the upper surface of the common electrode 1041. In FIG. 1, the display material 1061 is rotated to a specific direction based on the electric field. Depending on the rotated direction of the display material 1061, the polarized light may pass through, partially pass through or not pass through the upper polarizing layer 110. Therefore, the gray level of the pixel can be determined.

Figure 4:
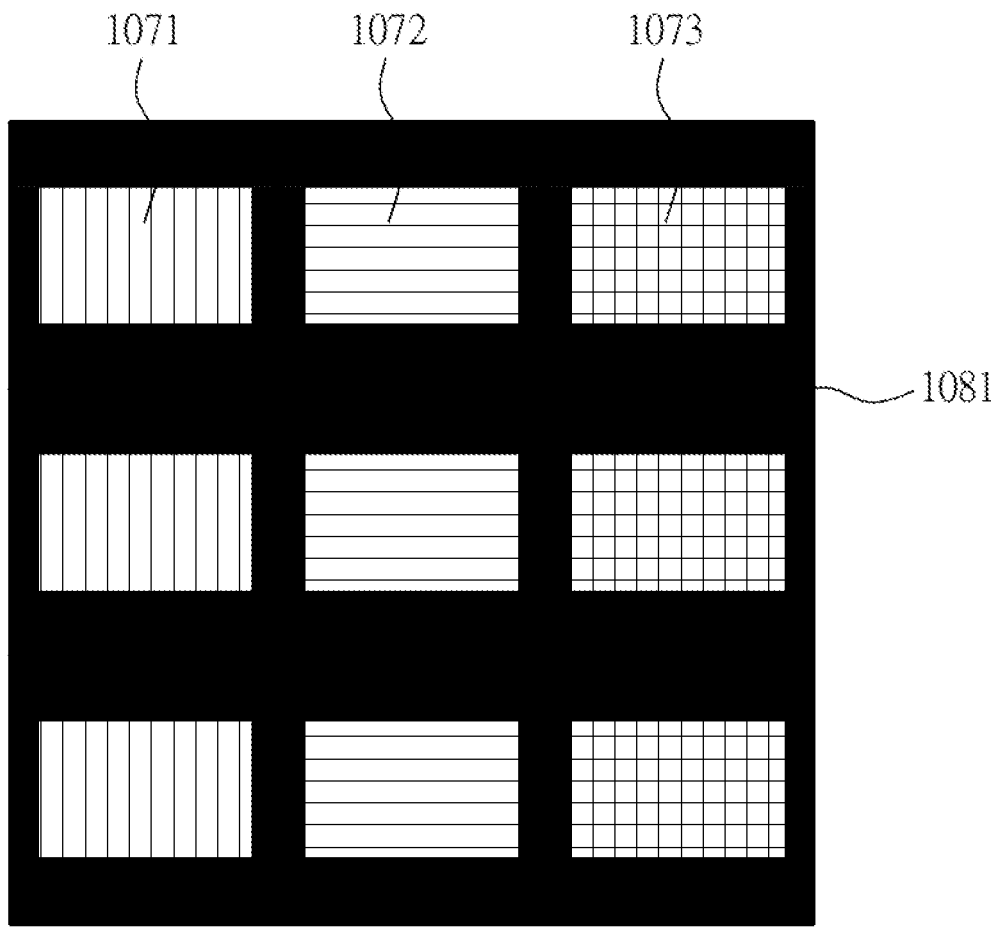
FIG. 4 is a top view of a color filter layer and a black matrix layer in accordance with the first embodiment of the present disclosure.

With reference to FIG. 1 again, the color filter layer 107 includes a plurality of color filters. As shown in FIG. 4, the color filter layer 107 includes a plurality of red color filter 1071, a plurality of green color filters 1072, and a plurality of blue color filters 1073, which are corresponding to the sub-pixels 201, 202 and 203 shown in FIG. 2. When white light emitting from a lower backlight device (not shown) passes through the color filter layer 107, it can display a color.

The black matrix layer 108 includes an opaque region 1081. The opaque region 1081 is composed of a plurality of black lines. The opaque region 1081 is preferably disposed above the thin film transistor 1031, the data line 1033 and the scan line 1032. More preferably, the opaque region 1081 is disposed to cover the top of the touch sensing electrode 1052. Therefore, it can prevent the ambient light from direct irradiation to the thin film transistors 1031 or the touch sensing electrodes 1052, thereby maintaining the characteristics of these elements and thus ensuring the display quality of the touch display device.

FIG. 4 is a top view of a color filter layer 107 and a black matrix layer 108 in accordance with the first embodiment of the present disclosure. As shown, the opaque region 1081 surrounds the color filters 1071, 1022 and 1073 and thus presents a mesh-like shape. In the manufacture process, the black matrix layer 108 can be used to define the regions of the color filters 1071, 1072 and 1073. In another embodiment, the black matrix layer 108 may be omitted. In this case, a transparent display device can be realized in combination with a transparent substrate, a plurality of transparent transistors, a plurality of transparent circuit, and so on.

Figure 5:
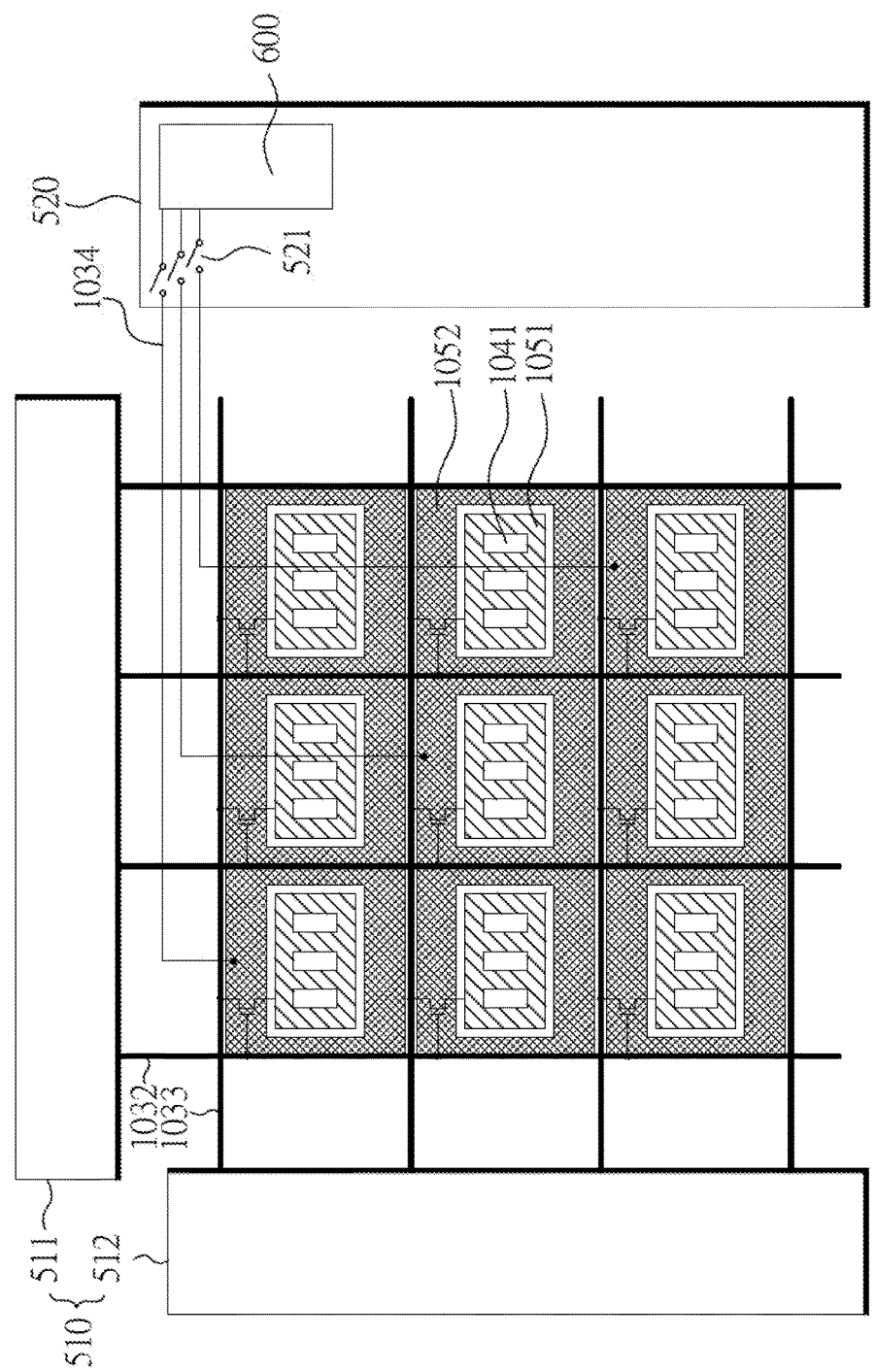
FIG. 5 is a circuit diagram of the touch display device in accordance with the first embodiment of the present disclosure.

FIG. 5 is a circuit diagram of the touch display device in accordance with the first embodiment of the present disclosure. As shown, the in-cell touch display device 100 includes a gate drive circuit 511, a source drive circuit 512, and a touch sense control circuit 520. The gate drive circuit 511 and the source drive circuit 512 belong to a display control circuit 510. The gate drive circuit 511 controls the gate of the thin film transistor 1031 through the scanning line 1032, and the source drive circuit 512 transmits signal from the data line 1033 to the thin film transistor 1031, so as to charge/discharge the pixel electrode 1051. The touch sense control circuit 520 includes a self-capacitance detection circuit 600 and a plurality of switches 521. The self-capacitance detection circuit 600 transmits the capacitance stimulation signal to the selected touch sense electrodes 1052 through the touch sense electrode traces 1034, and then reads the touch sense signal from the selected touch sense electrodes 1052. Through the switches 521, the touch sense control circuit 520 selects the touch sense electrodes 1052 to which the capacitance stimulation signal is transmitted, or the touch sense electrodes 1052 from which the touch sense signal is received.

Figure 6A:
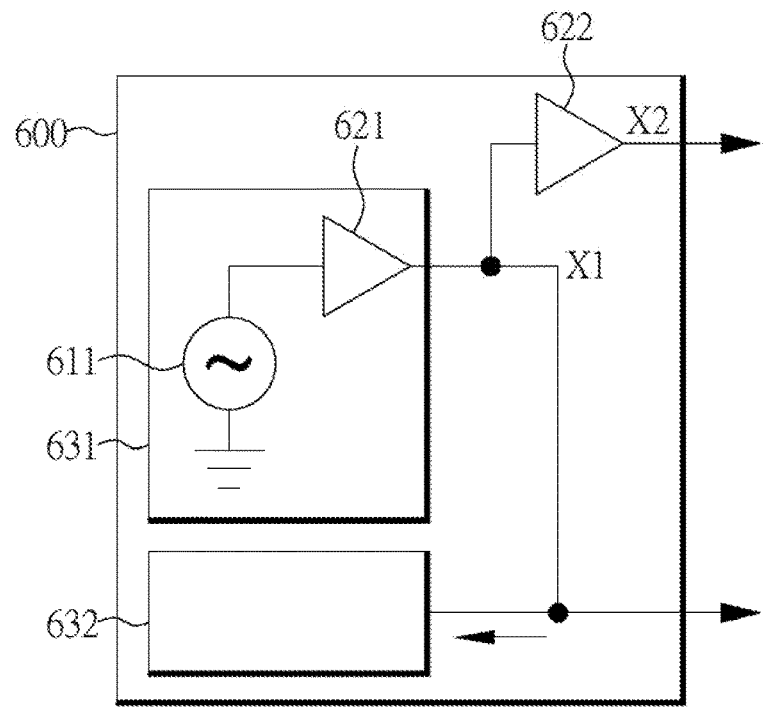
FIG. 6A is a first exemplary circuit diagram of a self-capacitance detection circuit in accordance with the first embodiment of the present disclosure.

FIG. 6A is a first exemplary circuit diagram of the self-capacitance detection circuit 600 in accordance with the first embodiment of the present disclosure. As shown, the self-capacitance detection circuit 600 includes an AC signal source 611, two amplifiers 621 and 622, and a capacitance read circuit 632. In addition, there are the two nodes X1 and X2 marked in FIG. 6A.

The gain of the amplifier 621 is greater than zero. The input of the amplifier 621 is connected to the AC source 611 and the output thereof is connected to the node X1. The amplifier 621 and the AC signal source 611 constitute a capacitance stimulation drive circuit 631 to output the capacitance stimulation signal from the node X1 to the selected touch sense electrodes 1052, wherein the capacitance stimulation signal is an AC signal. The capacitance stimulation signal can be sequentially or randomly outputted to the plurality of touch sense electrodes 1052. Specifically, in order to avoid mutual interference between the capacitance stimulation signal and the display signal, the capacitance stimulation signal and the display signal are sequentially or randomly staggered. For example, when the display signal is sequentially scanned, the capacitance stimulation signal is also sequentially scanned with a time delay to stagger the two signals. Alternatively, when the display signal is randomly scanned, the capacitance stimulation signal is also randomly scanned such that the two signals are staggered in most of the time.

The gain of the amplifier 622 is greater than zero. The input of the amplifier 622 is connected to the node X1 and the output thereof is connected to the node X2. The amplifier 622 receives the capacitance stimulation signal or the touch sense signal, and then outputs a reflection shielding signal to the selected reflection shielding electrodes 1042. The phase of the reflection shielding signal is the same as that of the capacitance stimulation signal or the touch sense signal. Since the capacitance stimulation signal or the touch sense signal has the same phase as that of the reflection shielding signal, the capacitive coupling effect between the touch sense electrode traces 1034 and the reflection shielding electrodes 1042 can be dramatically reduced, and thus the capacitance stimulation signal and the touch sense signal transmitted at the touch sense electrode traces 1034 can be sustained without being interfered.

The capacitance read circuit 632 is connected to the node X1 to read the touch sense signal. In a touch detection process, the capacitance stimulation signal is outputted from the capacitance stimulation drive circuit 631, and transmitted to the selected touch sense electrode 1052 through the touch sense electrode trace 1034. The capacitance stimulation signal is converted to the touch sense signal by the touch sense electrodes 1052, and the touch sense signal is transmitted to the capacitance read circuit 632 through the touch sense electrode trace 1034. The capacitance read circuit 632 compares the capacitance stimulation signal with the touch sense signal to find the difference therebetween, and further determines whether the selected touch sense electrode 1052 is touched or not.

Figure 6B:
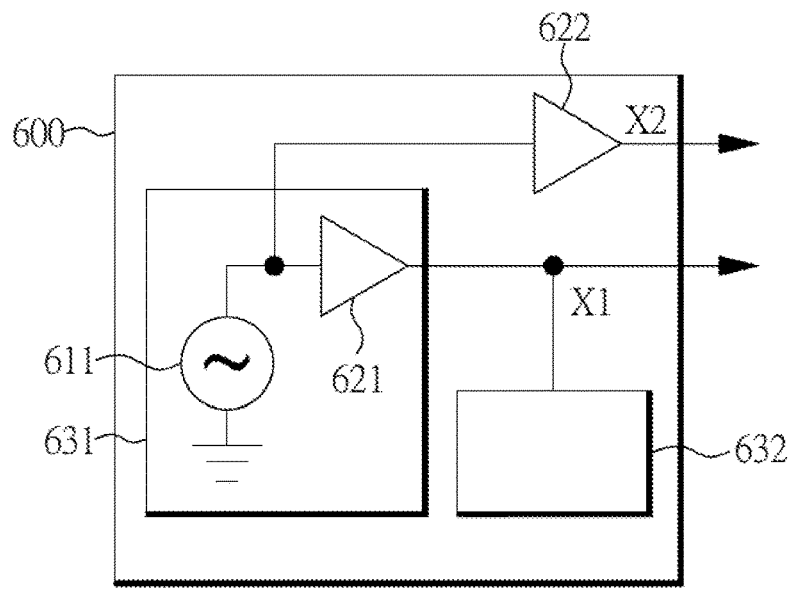
FIG. 6B is a second exemplary circuit diagram of the self-capacitance detection circuit in accordance with the first embodiment of the present disclosure.

FIG. 6B is a second exemplary circuit diagram of the self-capacitance detection circuit 600 in accordance with the first embodiment of the present disclosure. As shown, in this example, the self-capacitance detection circuit 600 includes an AC signal source 611, two amplifiers 621 and 622, and a capacitance read circuit 632. The circuit diagram of FIG. 6B is similar to that of FIG. 6A except: the input of the amplifier 622 is connected to the AC signal source 611 rather than the node X1. In such a configuration, the phase of the reflection shielding signal is the same as that of the capacitance stimulation signal or the touch sense signal, and the capacitance stimulation signal and the touch sense signal can be sustained without being interfered.

Figure 7:
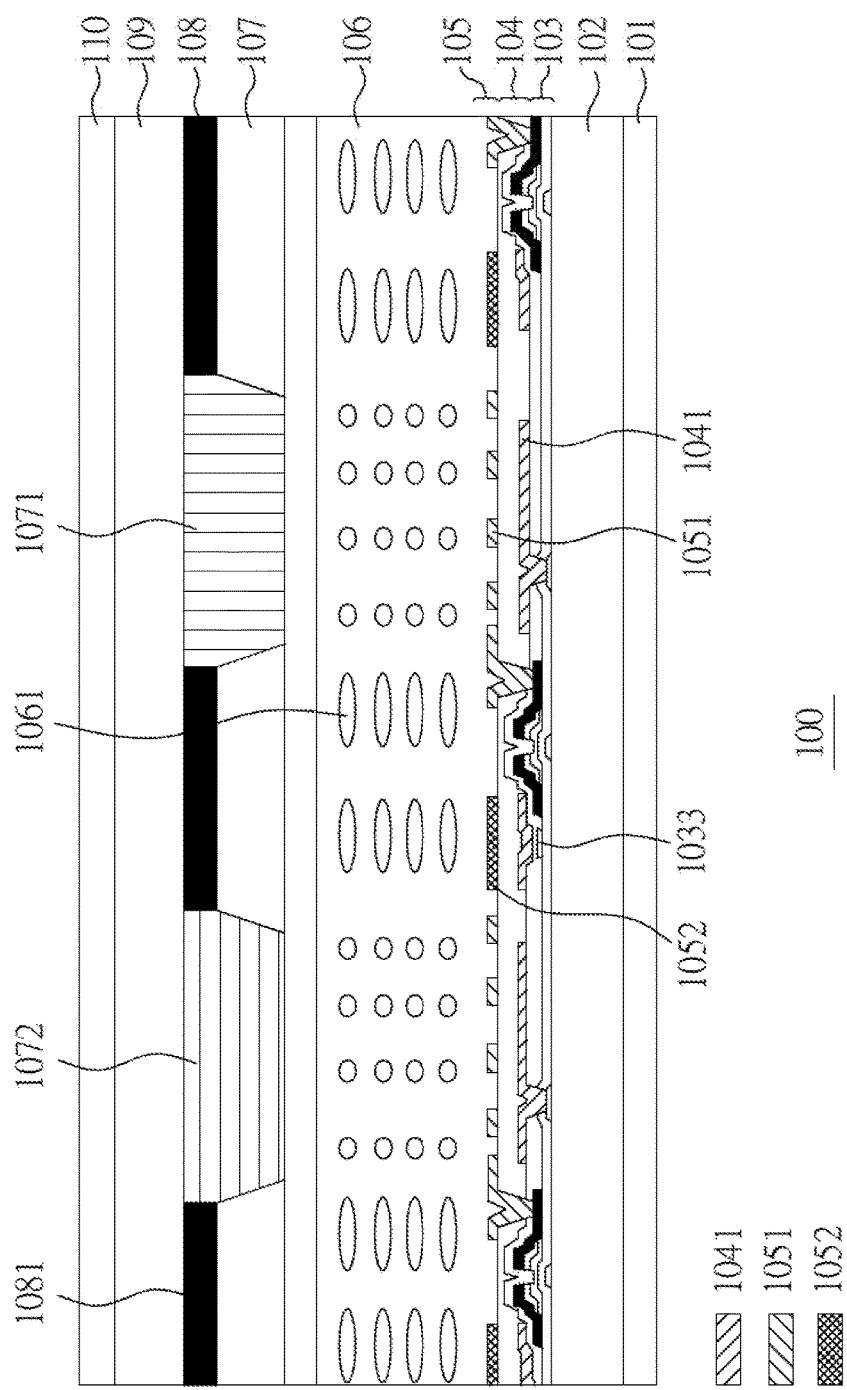
FIG. 7 is a cross-sectional view of an in-cell touch display device with transparent mesh-like touch electrodes in accordance with a second embodiment of the present disclosure.

FIG. 7 is a cross-sectional view of an in-cell touch display device 100 with transparent mesh-like touch electrodes in accordance with a second embodiment of the present disclosure. As shown, the in-cell touch display device 100 sequentially includes a lower polarization layer 101, a lower substrate 102, a thin film transistor layer 103, a common electrode layer 104, an electrode integration layer 105, a display material layer 106, a color filter layer 107, a black matrix layer 108, an upper substrate 109 and an upper polarization layer 110. In this embodiment, except for the common electrode layer 104, the material, structure, arrangement and function of the other elements are the same as those of the first embodiment.

As shown in FIG. 7, in this embodiment, the common electrode layer 104 only includes the common electrodes 1041 while there is no reflection shielding electrodes. In another aspect, the reflection shielding electrodes 1042 of the first embodiment is replaced with the common electrode 1041 of this embodiment. In this embodiment, the common electrode 1041 is preferably a whole piece of transparent conductive layer. For the pixel electrodes 1051, if the common electrode 1041 is a whole piece of transparent conductive layer, the capacitance between the pixel electrode 1051 and the common electrode 1041 is large, and thus the display quality can be increased. For the touch sense electrodes 1052, if the common electrode 1041 is a whole piece of transparent conductive layer, it can provide a shielding effect to prevent the lower side circuit from interfering the touch sense electrodes 1052.

Figure 3B:
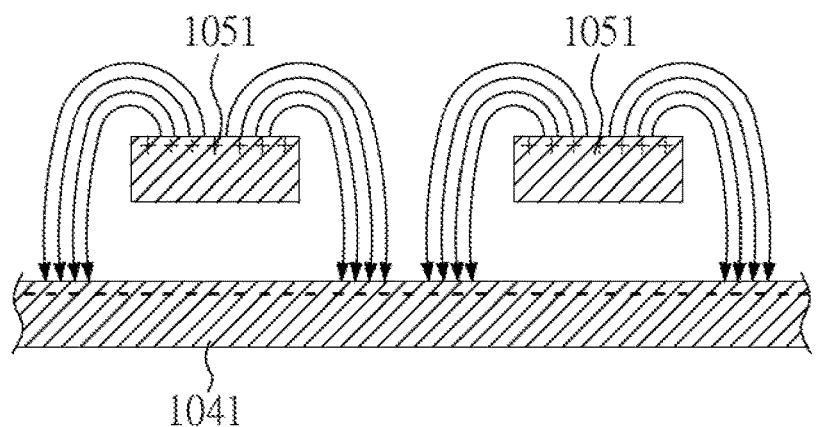
FIG. 3B is a schematic view of the electric field between the pixel electrodes and the common electrode in accordance with a second embodiment of the present disclosure.

The display technology used in this embodiment is fringe field switching (FFS). In comparison with the first embodiment, the common electrode 1041 of this embodiment is a whole piece. The pixel electrode 1051 is parallel to the common electrode 1041, and there is a space between two adjacent pixel electrodes 1051. FIG. 3B is a schematic view of the electric field between the pixel electrodes 1051 and the common electrode 1041 in accordance with the second embodiment of the present disclosure. As shown, the distribution of the electric field in this embodiment is similar to that of the electric field in the first embodiment.

Figure 8:
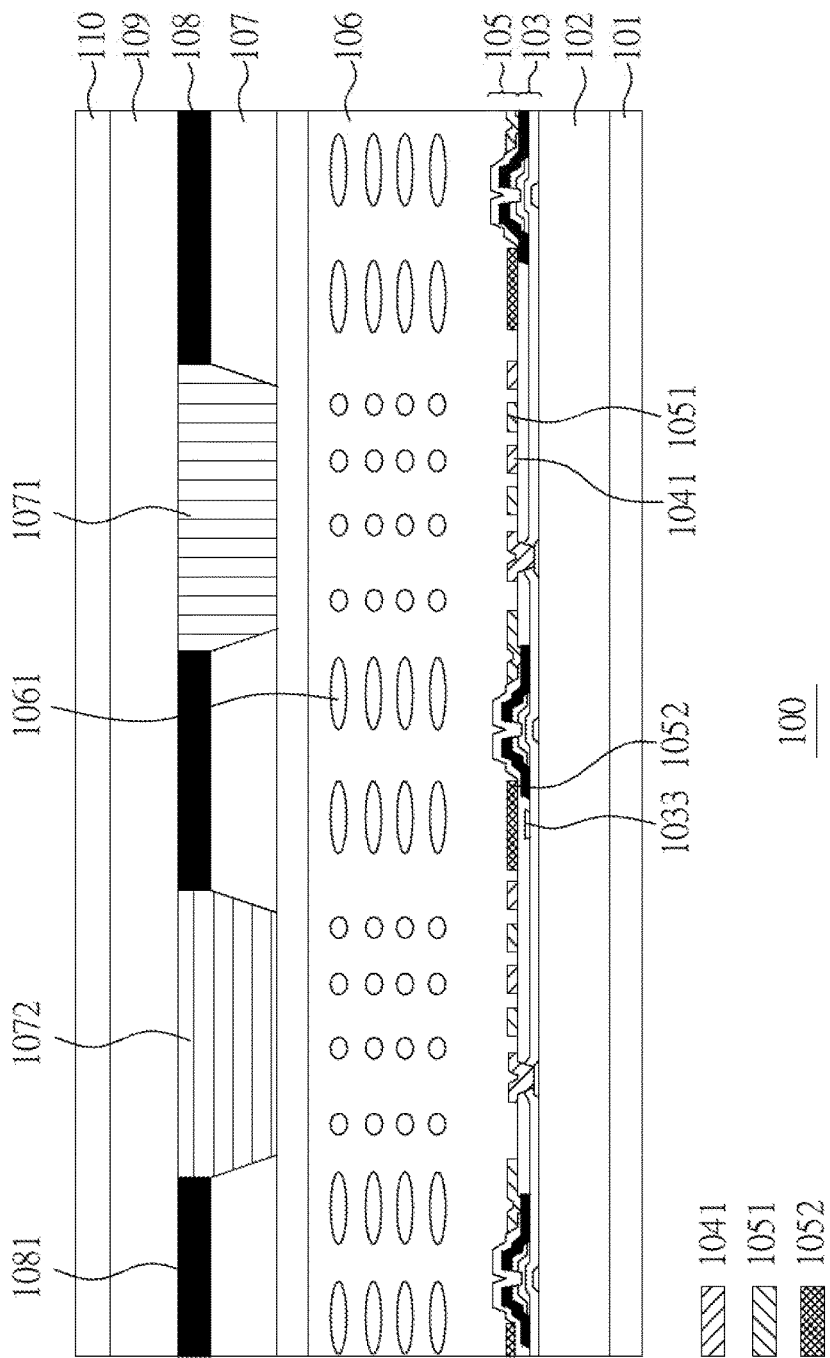
FIG. 8 is a cross-sectional view of an in-cell touch display device with transparent mesh-like touch electrodes in accordance with a third embodiment of the present disclosure.

FIG. 8 is a cross-sectional view of an in-cell touch display device 100 with transparent mesh-like touch electrodes in accordance with a third embodiment of the present disclosure. As shown, the in-cell touch display 100 sequentially includes a lower polarization layer 101, a lower substrate 102, a thin film transistor layer 103, an electrode integration layer 105, a display material layer 106, a color filter layer 107, a black matrix layer 108, an upper substrate 109 and an upper polarization layer 110. In comparison with the first embodiment, this embodiment does not have the common electrode layer. Furthermore, in this embodiment, except for the electrode integration layer 105, the material, structure, arrangement and function of the other elements are the same as those in the first embodiment.

In this embodiment, the common electrodes 1041 are integrated into the electrode integration layer 105. As shown in FIG. 8, the common electrode 1041, the pixel electrode 1051 and the touch electrode 1052 are in the same layer. Specifically, at least part of the common electrode 1041, part of the pixel electrode 1051, and part of the touch electrode 1052 are in the same plane. Accordingly, the touch elements can be embedded and integrated into the display device, and the size of the integrated touch display device can be miniaturized. Since the common electrode 1041, the pixel electrode 1051 and the touch electrode 1052 are in the same layer, the three are preferably formed in the same manufacture process. For example, the three are formed with the same transparent conductive material or with the same mask. Therefore, the manufacture process can be simplified.

The display technology used in this embodiment is known as in-plane switching (IPS). As shown in FIG. 8, the pixel electrode 1051 and the common electrode 1041 are disposed in the same plane and in a staggered arrangement. That is, a common electrode 1041 is disposed at the space between two adjacent pixel electrodes 1051, or a pixel electrode 1051 is disposed at the space between two adjacent common electrodes 1041.

Figure 3C:
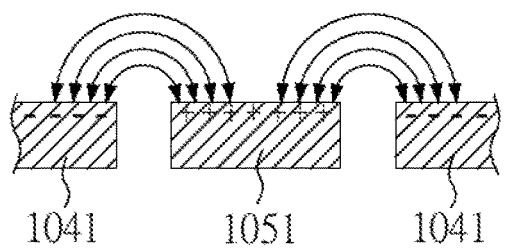
FIG. 3C is a schematic view of the electric field between the pixel electrode and the common electrodes in accordance with a third embodiment of the present disclosure.

FIG. 3C is a schematic view of the electric field between the pixel electrode 1051 and the common electrodes 1041 in accordance with the third embodiment of the present disclosure. As shown, when the pixel electrode 1051 and the common electrode 1041 are respectively applied with voltage, an electric field is formed between the pixel electrode 1051 and the common electrode 1041. For example, if the pixel electrode 1051 is used as the positive electrode and the common electrode 1041 is used as the negative electrode, the electric field is emitted from the pixel electrode 1051 toward the common electrode 1041. In this case, the display material 1061 is affected by the electric field emitted from the upper surface of the pixel electrode 1051 toward the upper surface of the common electrode 1041. In FIG. 8, the display material 1061 is rotated to a specific direction based on the electric field. Depending on the rotated direction of the display material 1061, the polarized light may pass through the upper polarization layer 110, partially pass through the upper polarization layer 110, or not pass through the upper polarization layer 110. Therefore, the gray level of the pixel can be determined.

The circuit for the third embodiment can be the same as the circuit 500 of the first embodiment, and thus a detailed description therefor is deemed unnecessary.

In view of the foregoing, the present disclosure provides an electrode integration layer in which the pixel electrodes and the touch electrodes are integrated in the same layer, such that the touch elements can be embedded and integrated into the display device. Therefore, the size of the touch display device can be dramatically reduced and the manufacture process can be simplified. In addition, in the present disclosure, it uses self-capacitance sense technology to reduce mutual interference between lines connected to corresponding sense electrodes. In some embodiments of the present disclosure, in consideration of the sensitivity of the touch sense electrodes, the reflection shielding electrodes are provided and applied with corresponding reflection shielding signal to prevent other elements from interfering the touch sense electrodes. Therefore, the noise problem of the in-cell touch display device can be mitigated.

Although the present invention has been explained in relation to its preferred embodiment, it is to be understood that many other possible modifications and variations can be made without departing from the spirit and scope of the invention as hereinafter claimed.

What is claimed is:

1. An in-cell touch display device with transparent mesh-like touch electrodes, comprising:
    a lower substrate;
    a thin film transistor layer arranged on the lower substrate, and including a plurality of thin film transistors;
    a common electrode layer arranged on the thin film transistor layer, and including a plurality of common electrodes which are connected to each other;
    an electrode integration layer arranged on the common electrode layer, and including a plurality of pixel electrodes and a plurality of touch sense electrodes each corresponding to a group of the pixel electrodes, wherein each touch sense electrode is formed by a plurality of transparent mesh-like touch electrodes surrounding the corresponding pixel electrodes; and
    a display material layer arranged on the electrode integration layer, and including a display material;
    wherein the touch sense electrodes are arranged on the same plane as a single layer self-capacitance sense structure, and only the touch sense electrodes perform a touch sense operation.

2. The in-cell touch display device with transparent mesh-like touch electrodes as claimed in claim 1, wherein the thin film transistor layer further comprises a plurality of gate lines, a plurality of data lines, and a plurality of sense electrode line.

3. The in-cell touch display device with transparent mesh-like touch electrodes as claimed in claim 1, wherein the pixel electrodes, the common electrodes and the touch sense electrodes are each made of material selected from a group consisting of ITO, ZnO, IZO, GZO, conductive polymer, carbon nanotube, graphene, or silver film with thickness less than 50 nanometers.

4. The in-cell touch display device with transparent mesh-like touch electrodes as claimed in claim 1, wherein the pixel electrodes, the common electrodes and the touch sense electrodes are made of same material.

5. The in-cell touch display device with transparent mesh-like touch electrodes as claimed in claim 1, further comprising:
    a touch sense control circuit including a self-capacitance detection circuit outputting a capacitance stimulation signal to a selected one of the touch sense electrodes and reading a touch sense signal from the selected touch sense electrode, wherein the capacitance stimulation signal is an AC signal.

6. The in-cell touch display device with transparent mesh-like touch electrodes as claimed in claim 1, wherein the common electrode layer further including a plurality of reflection shielding electrodes,
wherein the reflection shielding electrodes are disposed at positions corresponding to those of the touch sense electrodes.

7. The in-cell touch display device with transparent mesh-like touch electrodes as claimed in claim 6, further comprising:
a touch sense control circuit including a self-capacitance detection circuit outputting a capacitance stimulation signal to a selected one of the touch sense electrodes and reading a touch sense signal from the selected touch sense electrode, wherein the capacitance stimulation signal is an AC signal, and touch sense control circuit outputs a reflection shielding signal to the reflection shielding electrodes corresponding to the selected touch sense electrode.

8. The in-cell touch display device with transparent mesh-like touch electrodes as claimed in claim 7, wherein the reflection shielding signal and the capacitance stimulation signal is in phase, or the reflection shielding signal and the touch sense signal is in phase.

9. An in-cell touch display device with transparent mesh-like touch electrodes, comprising:
a lower substrate;
a thin film transistor layer arranged on the lower substrate, and including a plurality of thin film transistors;
an electrode integration layer arranged on the thin film transistor layer, and including a plurality of common electrodes connected to each other, a plurality of pixel electrodes, and a plurality of touch sense electrodes each corresponding to a group of the pixel electrodes, wherein each touch sense electrode is formed by a plurality of transparent mesh-like touch electrodes surrounding the corresponding pixel electrodes; and
a display material layer arranged on the electrode integration layer, and including a display material;
wherein the touch sense electrodes are arranged on the same plane as a single layer self-capacitance sense structure, and only the touch sense electrodes perform a touch sense operation.

10. The in-cell touch display device with transparent mesh-like touch electrodes as claimed in claim 9, wherein the thin film transistor layer further comprises a plurality of gate lines, a plurality of data lines, and a plurality of sense electrode lines.

11. The in-cell touch display device with transparent mesh-like touch electrodes as claimed in claim 9, wherein the pixel electrodes, the common electrodes and the touch sense electrodes are each made of material selected from a group consisting of ITO, ZnO, IZO, GZO, conductive polymer, carbon nanotube, graphene, or silver film with thickness less than 50 nanometer.

12. The in-cell touch display device with transparent mesh-like touch electrodes as claimed in claim 9, wherein the pixel electrodes, the common electrodes and the touch sense electrodes are made of same material.

13. The in-cell touch display device with transparent mesh-like touch electrodes as claimed in claim 9, further comprising:
a touch sense control circuit including a self-capacitance detection circuit outputting a capacitance stimulation signal to a selected one of the touch sense electrodes and reading a touch sense signal from the selected touch sense electrode, wherein the capacitance stimulation signal is an AC signal.

* * * * *